US008863888B2

(12) United States Patent
Ochiai et al.

(10) Patent No.: US 8,863,888 B2
(45) Date of Patent: Oct. 21, 2014

(54) ELECTRIC POWER STEERING DEVICE

(75) Inventors: Takayuki Ochiai, Maebashi (JP); Naoki Sawada, Maebashi (JP)

(73) Assignee: NSK Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 13/259,684

(22) PCT Filed: Aug. 31, 2011

(86) PCT No.: PCT/JP2011/004864
§ 371 (c)(1),
(2), (4) Date: Sep. 23, 2011

(87) PCT Pub. No.: WO2012/046380
PCT Pub. Date: Apr. 12, 2012

(65) Prior Publication Data
US 2014/0076653 A1    Mar. 20, 2014

(30) Foreign Application Priority Data

Oct. 6, 2010  (JP) .................................. 2010-226644
Oct. 6, 2010  (JP) .................................. 2010-226645

(51) Int. Cl.
*B62D 5/04* (2006.01)
*H02K 5/22* (2006.01)
*H02K 7/116* (2006.01)
*H02K 11/00* (2006.01)

(52) U.S. Cl.
CPC ............ *B62D 5/0403* (2013.01); *H02K 7/1166* (2013.01); *H02K 5/225* (2013.01); *H02K 11/0084* (2013.01); *B62D 5/0454* (2013.01)
USPC ...................................... 180/444

(58) Field of Classification Search
CPC .. B62D 5/0409; B62D 5/0448; B62D 5/0406; B62D 5/008; G05D 15/01
USPC ........................................ 180/444; 74/388 PS
See application file for complete search history.

(56) References Cited

U.S. PATENT DOCUMENTS 6,745,865 B2    6/2004   Hama et al.
6,989,616 B2 *  1/2006   Okubo et al. ................... 310/64
(Continued)

FOREIGN PATENT DOCUMENTS

CN          1699796 A      11/2005
CN         101378944 A       3/2009
(Continued)

OTHER PUBLICATIONS

Japanese Office Action with English Translation dated May 14, 2013 (four (4) pages).

(Continued)

*Primary Examiner* — Tony Winner
(74) *Attorney, Agent, or Firm* — Crowell & Moring LLP

(57) ABSTRACT

An electric motor (5) includes a motor case (30) in which a motor rotating member of which one end is opened and is formed in a cylindrical shape, and a substantially disc-shaped flange member (31) linked so as to close an opening of the one end of the motor case. The flange member is provided with two mounting flanges (31d,31e) to be fixed to the motor mounting part (17) of the speed reduction gear box (4) by outwardly swelling at an irregularly pitched position, and one first abutting flange (31c) abutting to the motor mounting part by outwardly selling between the these two mounting flanges.

9 Claims, 14 Drawing Sheets

(56) References Cited

U.S. PATENT DOCUMENTS

| | | | |
|---|---|---|---|
| 7,021,418 B2* | 4/2006 | Tominaga et al. | 180/444 |
| 2003/0209382 A1* | 11/2003 | Hama et al. | 180/444 |
| 2005/0167183 A1* | 8/2005 | Tominaga et al. | 180/444 |
| 2009/0107756 A1 | 4/2009 | Miyoshi et al. | |
| 2009/0183940 A1 | 7/2009 | Sekine et al. | |
| 2009/0267430 A1* | 10/2009 | Imamura et al. | 310/71 |
| 2009/0295325 A1* | 12/2009 | Sekine et al. | 318/646 |

FOREIGN PATENT DOCUMENTS

| | | |
|---|---|---|
| JP | 10-225048 A | 8/1998 |
| JP | 2003-333805 A | 11/2003 |
| JP | 2004-251426 A | 9/2004 |
| JP | 2005-39970 A | 2/2005 |
| JP | 2006-232062 A | 9/2006 |
| JP | 2007-223501 A | 9/2007 |
| JP | 2007-276740 A | 10/2007 |
| JP | 2008-99405 A | 4/2008 |
| JP | 2009-11078 A | 1/2009 |
| JP | 2010-47238 A | 3/2010 |
| JP | 2010-154685 A | 7/2010 |

OTHER PUBLICATIONS

International Search Report dated Dec. 6, 2011 with English translation (four (4) pages).

International Preliminary Report on Patentability (PCT/IB/338 & PCT/IB/373), including Written Opinion (PCT/ISA/237) dated May 16, 2013 (seven (7) pages).

Chinese Office Action Dated Jan. 20, 2014 with English Translation (Seventeen (17) pages).

Chinese-language Office Action dated Jul. 9, 2014, with English translation (7 pages).

* cited by examiner

FIG. 12
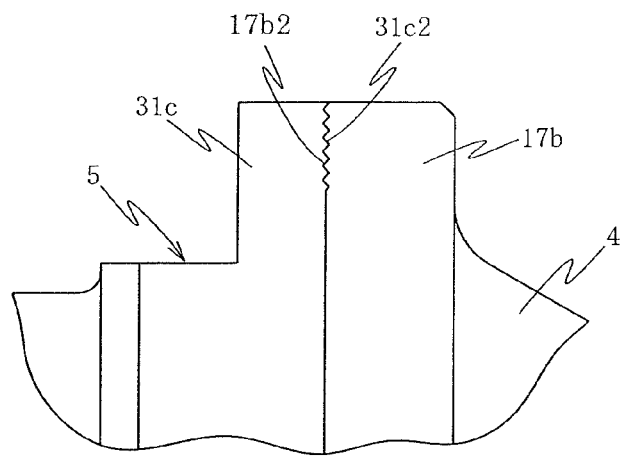
FIG. 13A
FIG. 13B
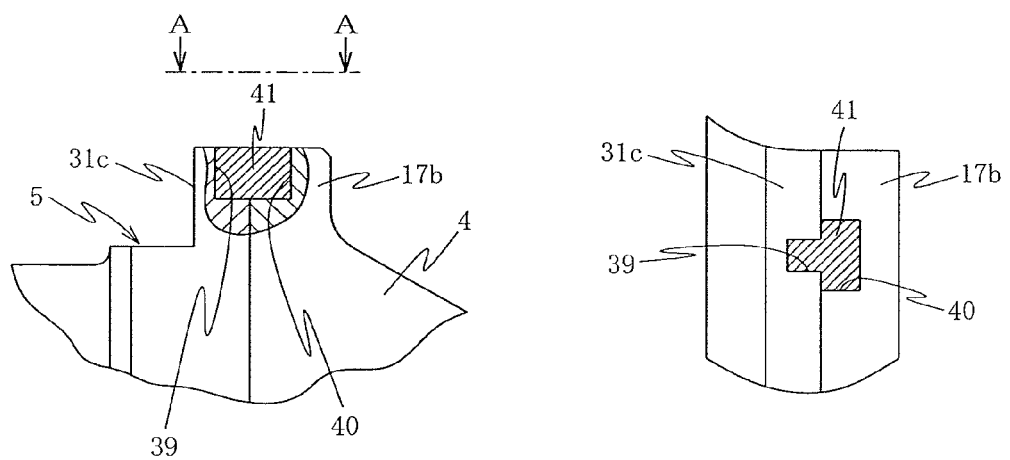

FIG. 16
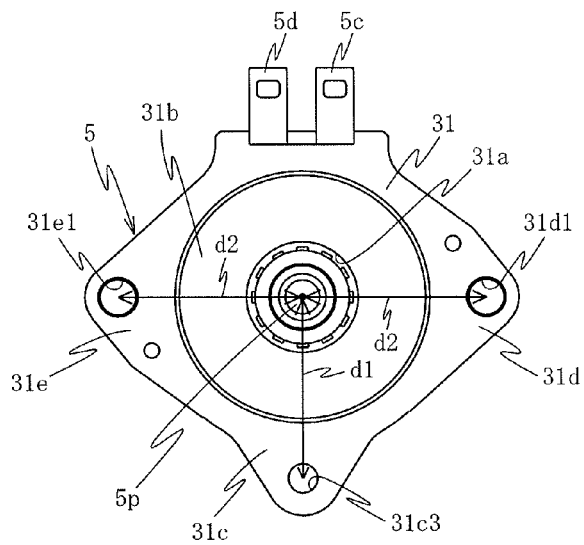
FIG. 17A
FIG. 17B
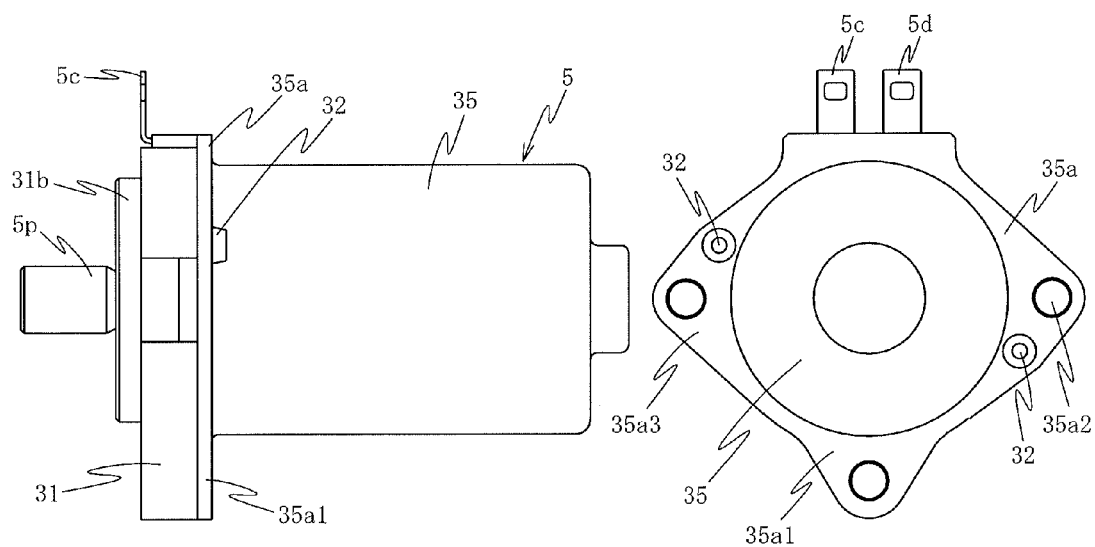

ELECTRIC POWER STEERING DEVICE

FIELD OF THE INVENTION

The present invention relates to an electric power steering device with an electric motor to transmit a steering assistance force to a steering system via a worm speed reduction mechanism installed in a speed reduction gear box.

RELATED ART

As an electric power steering device, it is well known a mechatronically-integrated electric power steering device in which a control unit is mounted on a speed reduction gear box and the control unit drives an electric motor based on detected steering torque information, and transmits a steering assistance force generated by the electronic motor to a steering system via a worm speed reduction mechanism (e.g. see Patent Document 1).

The worm speed reduction mechanism disclosed in Patent Document 1 is provided with a worm which is housed in a worm housing of the speed reduction gear box and is rotatably supported by a bearing member, and a worm wheel which is housed in a worm wheel housing and transmits torque to the steering system by meshing with the worm.

The electric motor has a structure to which a flange member is joined for closing an opening formed at one end side of a motor case. An output shaft of the electric motor is coaxially coupled to the worm in the worm housing through the opening of the worm housing, and a mounting flange of the flange member is abutted on a motor mounting part provided at a rim of the opening of the worm housing by abutting it thereon for mounting the speed reduction gear box by screw clamping.

Here, the flange member of the electric motor disclosed in Patent Document 1 has two mounting flanges provided circumferentially away from each other. The electric motor is mounted on the speed reduction gearbox at these two fixed points (i.e., screw clamped position of the mounting flange and the motor mounting part).

PRIOR ART DOCUMENTS

Patent Documents

Patent Document 1: JP 2007-276740 A

SUMMARY OF THE INVENTION

Problem to be Solved

In the abovementioned electric power steering device disclosed in Patent Document 1, meshing backlash generated between the worm and the worm wheel of the worm speed reduction mechanism is transmitted as a centrifugal whirling force to a rotating part built in a motor case of the electric motor via the output shaft. When the centrifugal whirling force is transmitted to the rotating part, lurching behavior of the overall electric motor occurs with the two fixed points as a fulcrum. It is feared that the lurching behavior may impinge upon a rotational motor of the rotating part, which leads to deterioration of harmonic components.

Further, the electric motor produces an operating sound due to lurching behavior. Because the electric motor and the control unit of the mechatronically-integrated electric power steering device are arranged near driver's feet seated in a vehicle interior, it is feared that an enclosure of the control unit acts as a speaker, which would induce an increased operating sound during steering.

The present invention is made by focusing on the above-indicated problems remained unsolved thus far immanent in the prior art. An objective of the present invention is to provide an electric power steering device enable to attain a reduced operating sound, without impinging upon the harmonic components of the electric motor by suppressing the lurching behavior of the electric motor mounted on the speed reduction gear box.

Solution to the Problem

To accomplish the above-indicated objective, an electric power steering device according to one embodiment comprise: a steering Column in which a steering shaft through which steering torque is transmitted is installed therein; an electric motor for transmitting a steering assist force via a worm speed reduction mechanism in the speed reduction gear box to the steering shaft; a control unit for driving the electric motor; and a motor mounting part, provided in the speed reduction gear box, for mounting the electric motor to which a motor shaft is joined to a worm meshed with the worm wheel of the speed reduction mechanism, wherein the electric motor includes a motor case in which a motor rotation part of which one end is opened and is formed in a cylindrical shape is built in, and a substantially disc-shaped flange member linked so that the one end of the motor opening closes, and the flange member is provided with two mounting flanges to be fixed to the motor mounting part by outwardly evanginating therefrom at an irregularly pitched position in a circumferential direction of the flange member, and at least one first abutting flange abutting to the motor mounting part by outwardly evanginating between the two mounting flanges.

When the electric motor transmits a steering assist force to the steering shaft, meshing backlash generated between the worm and the worm wheel of the worm speed reduction mechanism is transmitted to the motor rotating part as a centrifugal whirling force via the motor shaft to the motor rotating part built in the motor case. When the centrifugal whirling force is transmitted to the motor rotating part, the overall motor including the motor case and the flange member is to generate lurching behavior.

However, the electric power steering device according to the one embodiment is provided with the two mounting flanges to be fixed to the motor mounting part by outwardly swelling the flange member of the electric motor at an irregularly pitched position in a circumferential direction; and at least one first abutting flange to be abutted to the motor mounting part by outwardly swelling between the these two mounting flanges. When the overall electric motor is to lurching with the two points out of the two mounting flanges and the one first abutting flange as a fulcrum, the remaining mounting flanges or the first abutting flange suppresses lurching behavior of the electric motor. Accordingly, because the lurching behavior of the electric motor is suppressed, it does not impinge on a rotating motion of the motor rotating part in the motor case. Further, since the lurching behavior of the electric motor fixed to the speed reduction gear box is suppressed, an operating sound of the electric motor is decreased.

In the electric power steering device according to one embodiment, a motor side external connecting part is protrudingly provided to connect to a unit side connecting part of the control unit at an outer circumference of the flange member, the first abutting flange is provided at a line symmetry position with the motor side external connecting part with respect to a first phantom line orthogonal to a shaft center of the motor shaft, and the two mounting flanges are provided at a line symmetry position with each other with respect to a second phantom line orthogonal on the same plane to the first phantom line.

According to the electric power steering device according to the one embodiment, the two mounting flanges and the one mounting flange abutting to the motor mounting part suppress the lurching behavior of the electric motor.

Further, in the electric power steering device according to one embodiment, the first abutting flange are provided front of a vehicle with respect to the first phantom line.

According to the electric power steering device according to the one embodiment, since the first abutting flange is provided forward of the vehicle having ample space, it allows assembly of the electric power steering device, which achieves space efficiency, resulting in being noninterference with another components.

Furthermore, in the electric power steering device according to one embodiment, the two first abutting flanges are provided apart from each other in a circumferential direction at an substantially line symmetry position with the motor side external connecting part.

According to the electric power steering device according to the one embodiment, the two first abutting flanges abut to the motor mounting part, it allows more suppression of the lurching behavior of the electric motor.

In the electric power steering device according to the one embodiment, the two first abutting flanges are provided apart from each other in a longitudinal direction of a vehicle and the two mounting flanges are provided apart from each other in a vertical direction of the vehicle.

According to the electric power steering device according to the one embodiment, since the flange member of the electric motor is fixed on four points of the lateral direction of a vehicle and the perpendicular direction of the vehicle. The lurching behavior due on a centrifugal whirling of the worm can be securely prevented.

Moreover, in the electric power steering device according to the one embodiment, a minute projection locally abutting to one abutting surface is provided to the first abutting flange and to the other abutting surface of the motor mounting part abutting thereto.

According to the electric power steering device according to the one embodiment, since the minute projection provided on the one abutting surface of the first abutting flange and the motor mounting part is certainly abutted to the other abutting surface, it may dispense with provision of the abutting surface of the first abutting flange and the motor mounting part with increased surface accuracy. This reduces a manufacturing cost of the flange member and a manufacturing cost of the speed reduction gear box.

In the electric power steering device according to the one embodiment, the two mounting flanges and the one mounting abutting flange have a screw hole, a screw member screwed into the screw hole is fastened to the motor mounting part for fixing the first abutting flange to the motor mounting part, and at least one of the two mounting flanges and the one first mounting flange have a screw hole having the diameter smaller than that of the two mounting flanges and the one mounting flange.

According to the electric power steering device according to the one embodiment, it may set larger backlash to the moment occurred when the electric motor lurches toward at least one of the two mounting flanges and the one first mounting flange, and further may suppress the lurching behavior of the electric motor.

In the electric power steering device according to the one embodiment, the abutting surface of the first abutting flange and the motor mounting part abutting thereto is formed into a rough surface having irregular unevenness, and gap filler is filled into a gap of the these both rough surfaces.

According to the electric power steering device according to the one embodiment, since adhesiveness of the abutting surface of the first abutting flange and the motor mounting part are improved by interposing the gap filler into a gap of the rough surface (abutting surface) of the first abutting flange and the motor mounting part, it allows more suppression of the lurching behavior of the electric motor.

In the electric power steering device according to the one embodiment, a concave is formed on the abutting surface of the motor mounting part abutting to the first abutting flange and the motor mounting part abutting thereto at a position facing each other, and an elastic body is filled elastically compressed into the concaves.

According to the electric power steering device according to the one embodiment, since the concave is formed on the abutting surface of the first abutting flange and the motor mounting part, and adhesiveness of the abutting surface of the first flange and the motor mounting part is improved by filling the elastic body into these by elastically compressing, it suppresses the lurching behavior of the electric motor.

In the electric power steering device according to the one embodiment, a second flange member which outwardly evanginates from the flange member and abuts to the motor mounting part is provided at a position which is line symmetry with the first abutting flange with respect to the first phantom line and is adjacent to the motor side external connecting part to be connected to the unit side external connecting part of the control unit.

According to the electric power steering device according to the one embodiment, since the second abutting flange provided at a position adjacent to the motor side external connecting part abuts to the motor mounting abuts, it further suppresses the lurching behavior of the electric motor.

Advantageous Effect of the Invention

According to the present invention, the invention provides a flange member of an electric motor including two mounting flanges fixed to the motor mounting part, outwardly evaginatingly, at an irregularly pitched position in a circumferential direction, and at least one first abutting flange to be abutted on the motor mounting part, outwardly evaginatingly, between these two mounting flanges. Thus, even when the overall electric motor is to be lurching with two points out of the two mounting flanges and the one first abutting flange as a fulcrum, the remaining mounting flanges or the first abutting flange may suppress the lurching behavior of the electric motor. Consequently, the present invention precludes a possibility of aggravating the harmonic components as the lurching behavior of the electric motor is suppressed and does not affect a rotating motion of the armature built in the motor case.

Further, since the lurching behavior of the overall electric motor which is fixed to the speed reduction gearbox is suppressed, even when the electric motor and the control unit of the mechatronically-integrated electric power steering device is arranged near the driver's feet seated in the vehicle interior, the present invention enables reduction of an operating sound resulting from the electric motor 5 replete in the vehicle interior even so. Furthermore, it is not likely to impair a compact arrangement of the electric motor, the control unit, and the speed reduction gear box. Accordingly, the present invention may provide a small-sized and compact electric power steering device excellent in quietness.

BRIEF DESCRIPTION OF THE DRAWINGS

FIG. 5 shows an electric motor of a first embodiment, in which

FIG. 8 shows an electric motor according to a second embodiment, in which

FIG. 12 is a view showing a principle part of an electric motor according to a fifth embodiment;

FIG. 13 shows a principle part of an electric motor according to a sixth embodiment, in which FIG. 13A is a principle part of a side view, and FIG. 13B is an arrow view taken along a line A-A in FIG. 13A;

FIG. 14 shows an electric motor according to a seventh embodiment, in which

FIG. 16 is a view showing a modification of the electric motor according to the seventh embodiment seen from the flange member side;

FIG. 17 is a second modification of the electric motor according to the seventh embodiment, in which FIG. 17A is a side view, and FIG. 17B is a view seen from the motor case side; and FIG. 18 shows an electric motor according to an eighth embodiment, in which FIG. 18B is a view seen from the motor case side.

DESCRIPTION OF EMBODIMENTS

Hereinafter, an explanation will be made in detail to the best mode (hereafter, referred to as an embodiment) for carrying out the present invention with reference to the accompanied drawings.

Figure 1:
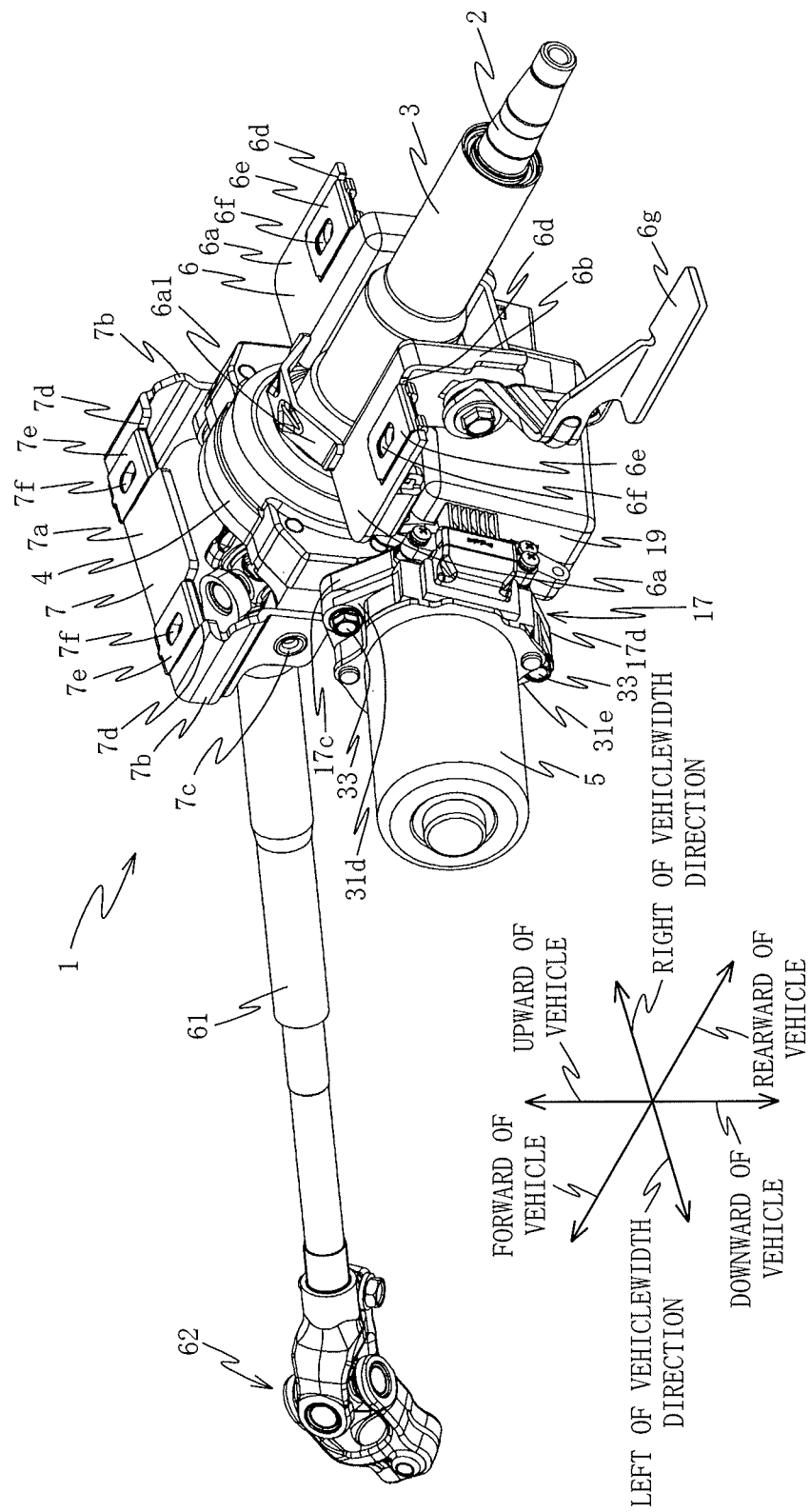
FIG. 1 is a perspective view shown from a left-handed side when one embodiment of an electric power steering according to the present invention is applied to a right-hand drive car.
Figure 2:
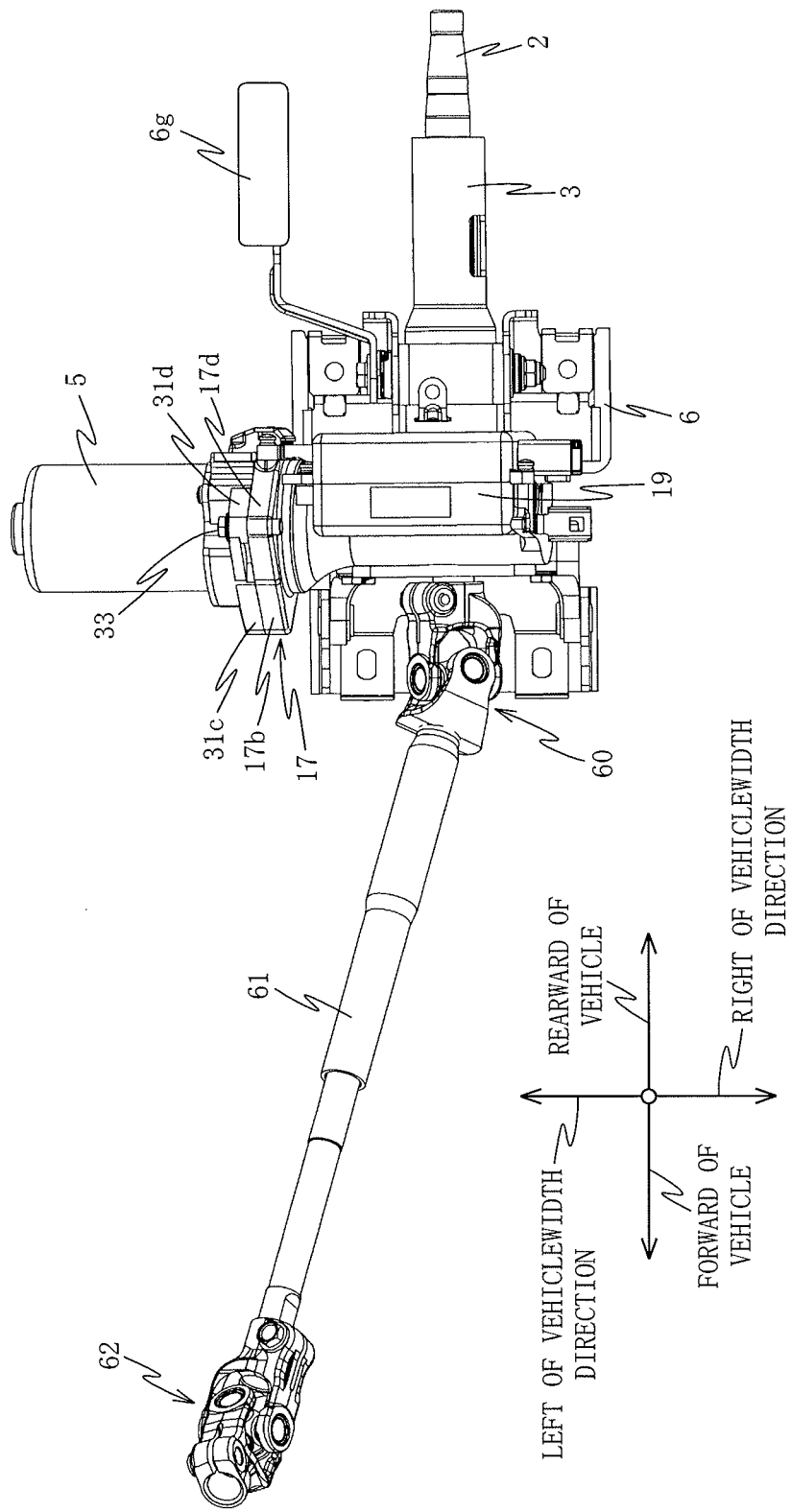
FIG. 2 is a view showing the electric power steering device seen from under the electric power steering device.
Figure 3:
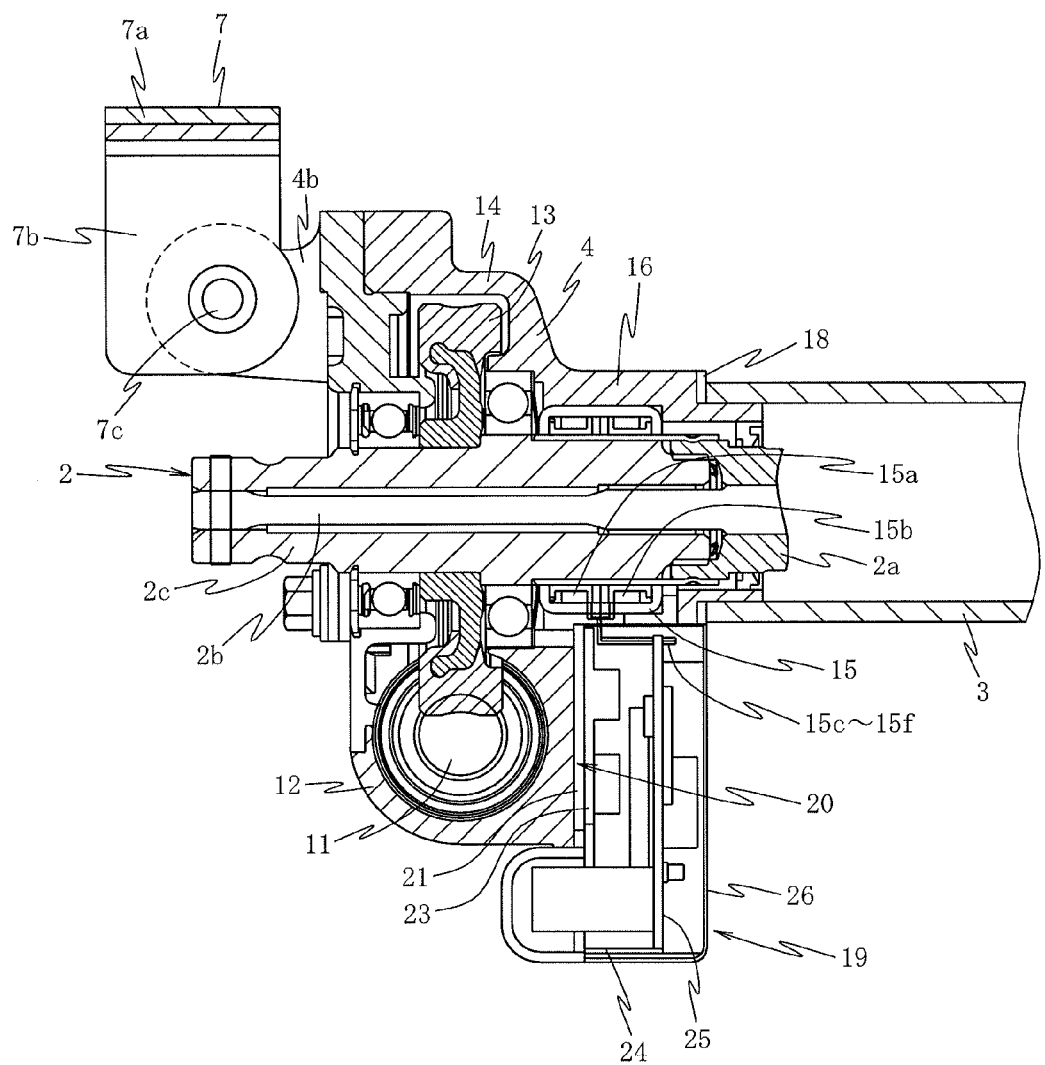
FIG. 3 is a longitudinal cross-sectional view showing a principle part of the electric power steering device.

FIG. 1 is a perspective view showing seen an electric power steering device according to the present invention from a driver's seat side. FIG. 2 is a view showing the electric power steering device according to the first embodiment seen from under a vehicle. FIG. 3 is a longitudinal cross-sectional view showing a principle part of the electric power steering device.

Reference numeral 1 shown in FIGS. 1 and 2 denotes a column-type electric power steering device in which a speed reduction gear box 4 is coupled to a steering column 3 where a steering shaft 2 coupled to a steering wheel (not shown) is rotatably installed therein, and an electric motor 5 configured of a brushless motor of which axial direction is extended in a direction orthogonal to an axial direction of the steering column 3 is arranged in the speed reduction gear box 4. One end of a lower shaft 61 is coupled via a universal joint 60 to the steering shaft 2, and a pinion shaft (not shown) is coupled via the universal joint 62 to the other end of the lower shaft 61.

The steering column 3 and the speed reduction gear box 4 are mounted on a vehicle body side through an upper mounting bracket 6 and a lower mounting bracket 7.

The lower mounting bracket 7 is composed of a mounting plate 7a and a pair of supporting plates 7b extending in parallel, keeping predetermined intervals in a lateral direction from an undersurface of the mounting plate 7a. A lower end of the supporting plate 7b is rotatably linked via a pivot 7c to the supporting part 4b (see FIG. 3) integrally provided at a front side of a vehicle of the speed reduction gear box 4. Further, a slit 7d is formed in the mounting plate 7a into which a desorption capsule 7e is fit. A bolt through hole 7f is formed in the desorption capsule 7e, and the mounting plate 7a is mounted on a vehicle body side member by screwing a fixing bolt (not shown) penetrating through the bolt through hole 7f from under the desorption capsule 7e into the vehicle body side member.

The upper mounting bracket 6 is provided with a pair of mounting plates 6a, a coupling plate 6a1 to couple these pair of the mounting plates 6a, a pair of supporting plates secured to a lower end of the pair of the mounting plates 6a and are apart from each other in a lateral (vehicle width) direction, and a tilt mechanism 6c to support the steering column 3 provided at these pair of the supporting plates 6b. Rotating a tilt lever 6g of the tilt mechanism 6c to release a supporting state of the steering column 3 allows a tilt position adjustment of the column 3, upward and downward, with the pivot 7c of the lower mounting bracket 7 as a fulcrum. Moreover, a slit 6d is formed in the pair of the mounting plate 6a to which the desorption capsule 6e is fit. A bolt through hole 6f is formed in the desorption capsule 6e and the mounting plate 6a is fit to the vehicle body side member by screwing the fixing bolt penetrating through the bolt through hole 6f from under the desorption capsule 6e into the vehicle body side member (not shown).

The steering shaft 2 is, as shown in FIG. 3, composed of an input shaft 2a of which upper end is coupled to the steering wheel (not shown), and an output shaft 2c to cover a torsion bar 2b coupled via the torsion bar 2b to the lower end of the input shaft 2a.

The speed reduction gear box 4 is made e.g., by die-cast molding any one of materials, having high thermal conductivity, selected from any one of aluminum, aluminum alloy, magnesium, and magnesium alloy. The speed reduction gearbox 4, as shown in FIG. 3, is provided with a worm housing 12 to house therein a worm 11 of a worm speed reducer linked to the output shaft (not shown) of the electric motor 5, a worm wheel housing 14 to house therein a worm wheel 13 which has a central axis orthogonal to a central axis of the worm housing 12 at a underside of the worm housing 12 and meshed with the worm 11; a torque sensor housing 16 to house a torque sensor 15 coaxially and integrally linked to a rear side of a vehicle of the worm wheel housing 14; a motor mounting part 17 (see FIG. 1) to mount the electric motor 5 provided on an open end face of the worm housing 12; a cylindrical column mounting part 18 provided on a rear end of a vehicle of the torque sensor housing 16; and a control unit mounting part 20 to mount a control unit 19 which is provided in a plane orthogonal to a central axis of the worm wheel housing 14 and the torque sensor housing 16, bridging over part of the worm housing 12 and the worm wheel housing 14. A front end of the vehicle of the steering column 3 is externally fitted to and linked to the column mounting part 18 of the speed reduction gear box 4.

The torque sensor 15 is configured so that it magnetically detects a torsion state of the torsion bar 2b linked between the input shaft 2a and the output shaft 2c of the steering shaft 2, and detects steering torque transmitted to the steering shaft by a pair of detection coils 15a and 15b. External connection terminals 15c to 15f outwardly extending in parallel in a direction orthogonal to a central axis of the steering column 3 are connected respectively to a winding start and a winding end of these pair of the detection coils 15a,15b. A projection of these external connection terminals 15c to 15f is bent into L-shaped form in parallel with the central axis of the steering column 3 at the center.

Figure 4:
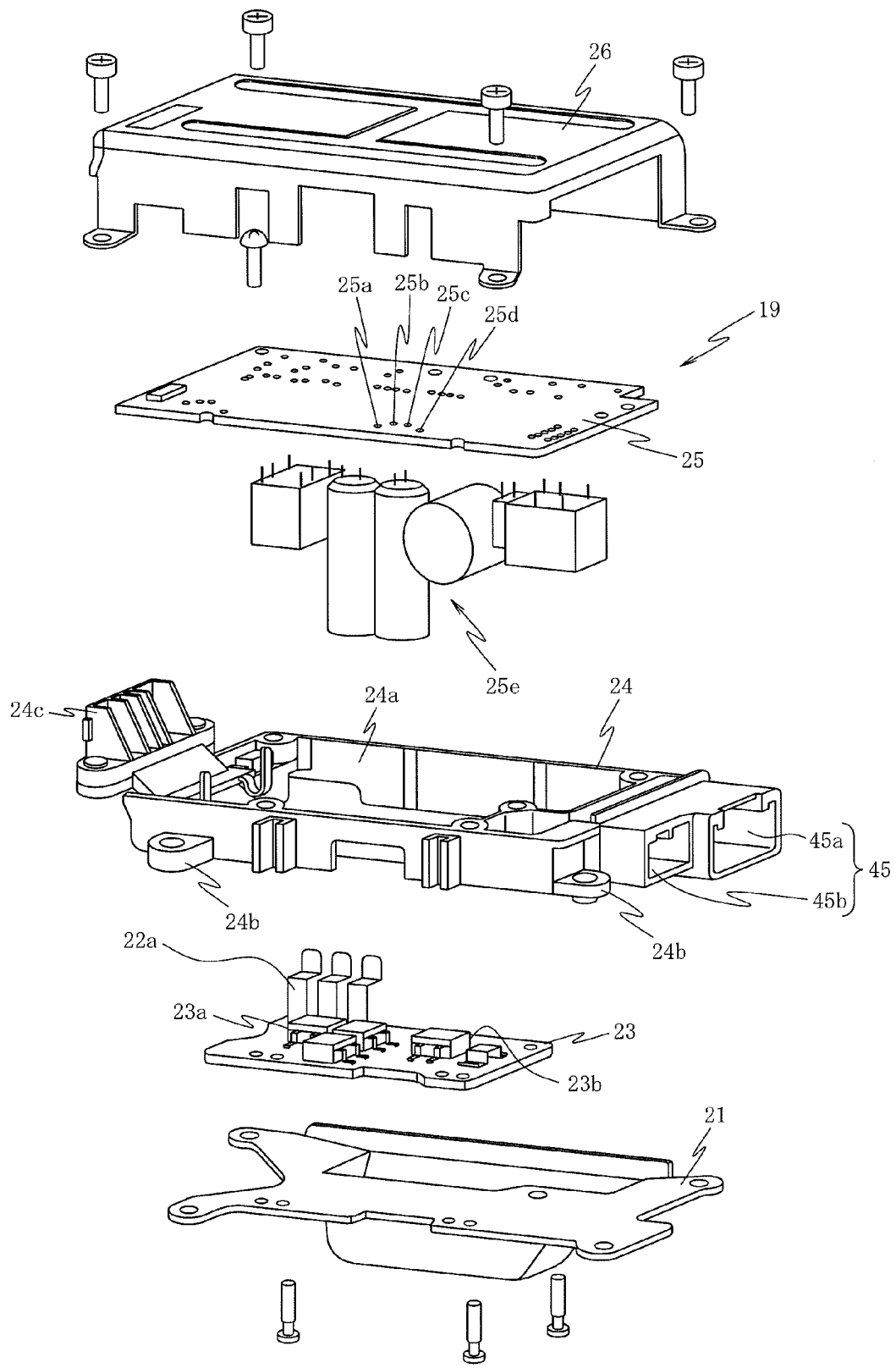
FIG. 4 is an exploded perspective view of the control unit.

The control unit 19 mounted on the control unit mounting part 20, as shown in FIG. 4, is provided with a metal heat radiating plate 21 having high thermal conductivity, a power substrate 23, a rectangular frame-shaped synthetic resin frame 24, a control substrate 25, and a cover 26.

The heat radiating plate 21 is directly fixed via heat radiating grease to a flat mounting plane of the control unit mounting part 20. On the power substrate 23, an H-bridge circuit configured of power switching elements such as a field-effect transistor to drive the electric motor 5, and discrete parts 23a,23b such as a pulse width modulation circuit to drive the power switching element of the H-bridge circuit. The synthetic resin frame 24 surrounds the power substrate 23. The control substrate 25 is mounted on a front of the synthetic resin frame 24, on which through holes 25a to 25d are drilled, through which external connection terminals 15c to 15f of the torque sensor 15 are directly penetrating. On the control substrate 25, a Micro Control Unit (MCU) and discrete parts 25e such as their peripheral equipments are implemented. The MCU calculates a steering assist current command value based on a torque detection value supplied from the torque sensor 15 and a vehicle speed detection value supplied from a vehicle speed sensor (not shown), and controls a steering assist force generated by the electric motor 5 by performing current feedback control based on the steering assist current command value and a detection value of a motor current output to the electric motor 5, and by calculating a voltage command value output to the pulse width modulation circuit of the power substrate 23. The cover 26 covers the power substrate 23, the synthetic resin frame 24, and the control substrate 25.

Further, the synthetic resin frame 24 is provided with a rectangular frame-shaped frame body 24a, a terminal block 24c which is provided on a left end of the frame body 24a and is electrically connected to connection terminals 5c, 5d of the electric motor 5, and a female connector 45 fixed to the right side of the frame body 24a. The female connector 25 is provided with a power connector 45a, and a signal connector 45b to connect to networks such a CAN for data transmission and reception with each control equipment of a vehicle body. The power substrate 23 and the control substrate 25 are connected via the connection terminal 22a.

In the control unit 19 having such a configuration, the power substrate 23 is screwed to an inner surface of the heat radiating plate 21. The heat radiating grease is coated to the control unit mounting part 20 of the speed reduction gear box 4, and the heat radiating plate 21 is screwed down by abutting to the flat mounting plane of the control unit mounting part 20. The synthetic resin frame 24 is placed on the control unit mounting part 20 so as to surround the perimeter of the power substrate 23. The mounting plate 24b of the synthetic resin frame 24 is screwed down to the control unit mounting part 20 of the speed reduction gear box 4. The control substrate 25 is screwed down to the front side of the synthetic resin frame 24 after the external connection terminals 15c to 15f of the torque sensor 15 are inserted into its mounting through holes 25a to 25d. The external connection terminals 15c to 15f and the through holes 25a to 25d are soldered together, and the control unit 19 is mounted to the speed reduction gear box 4 by attaching the cover 26 on the control unit mounting part 20.

Figure 5A:
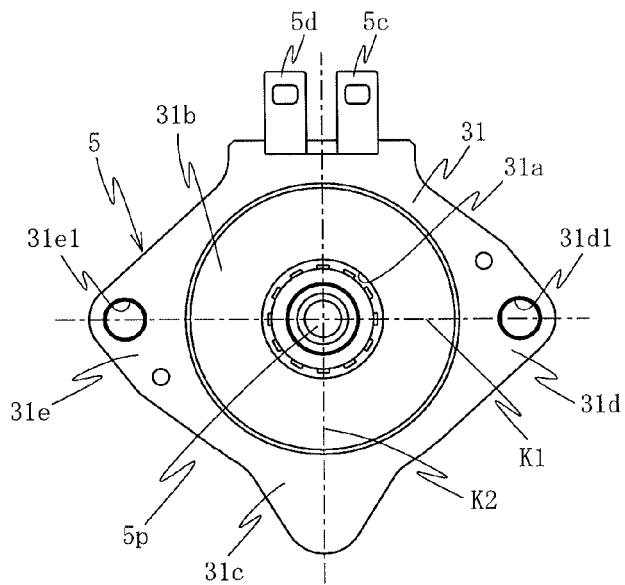
FIG. 5A is a side view.
Figure 5B:
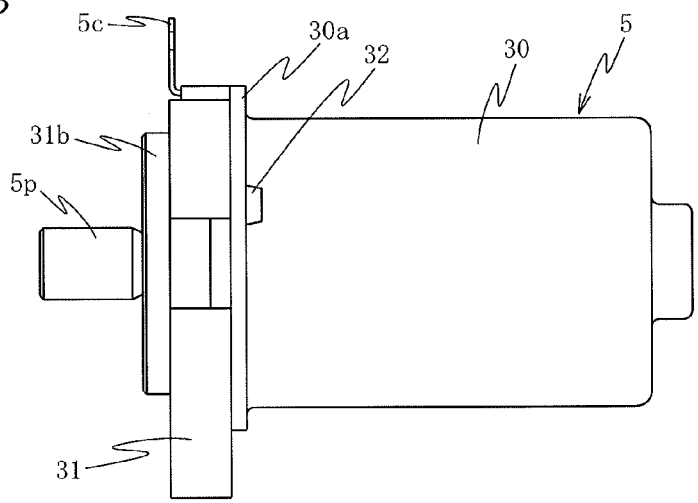
Figure 5C:
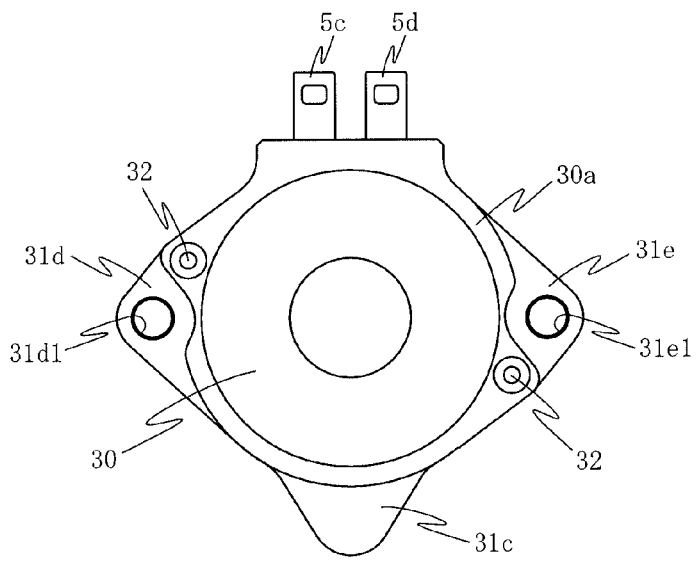
FIG. 5C is a view shown from a motor case side.

The electric motor 5, as shown in FIG. 5B, is formed entirely in a substantially hollow cylindrical shape and is provided with a motor case 30 in which an armature (not shown) is rotatably built in, and a flange member 31 joined so as to close an opening at one end side of the motor case 30. The motor case 30 and the flange member 31, as shown in FIG. 5C, are joined by fastening with a screw 32 the case flange 30a provided at a fringe of the opening of the motor case 30 and a side of the flange member 31 abutted thereto.

Figure 6:
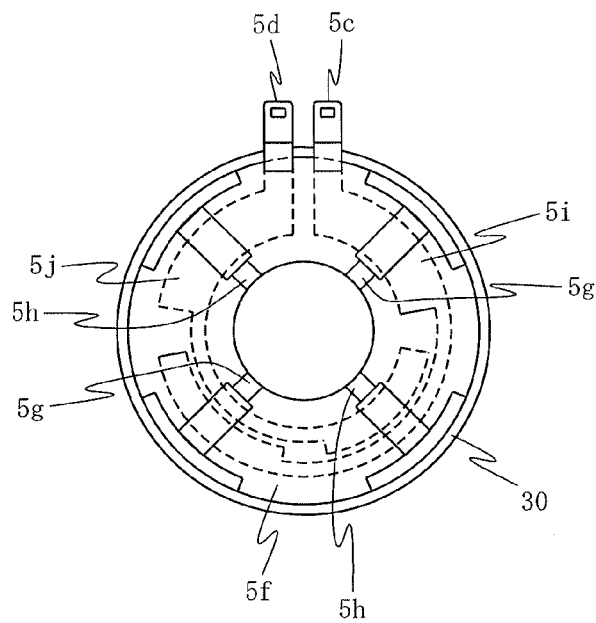
FIG. 6 is a cross-sectional view showing an internal structure of the electric motor.

On an outer circumference of the flange member 31, connection terminals 5c,5d are arranged at a position proximate to and opposing the control unit 19 mounted on the control unit mounting part 20. Each of the connection terminals 5c,5d, as shown in FIG. 6, is arranged isolated from each other in the synthetic resin brush support 5f having at its center of the bottom an armature through hole, and are integrally provided at one end where arc-shaped connection terminals 5i,5j independently connected to two set of brushes 5g,5h are opposing each other.

The flange member 31, as shown in FIG. 5a, is provided with a shaft hole 31a from which the motor shaft 5p outwardly protrudes, a mate fitting convex 31b which has a cylindrical shape concentric with the motor shaft 5p and outwardly protrudes, a first abutting flange 31c provided at a line symmetry position to the connection terminals 5c,5d with respect to a first phantom line K1 orthogonal to a shaft center of the electric motor 5p, and first and second mounting flanges 31d,31e respectively provided at a line symmetry position with respect to a second phantom line k2 orthogonal in the same plane to the first phantom line K1.

On the first and the second mounting flanges 31d,31e, screw holes 31d1,31e1 are formed at equal distance from the shaft center of the motor shaft 5p.

Figure 7:
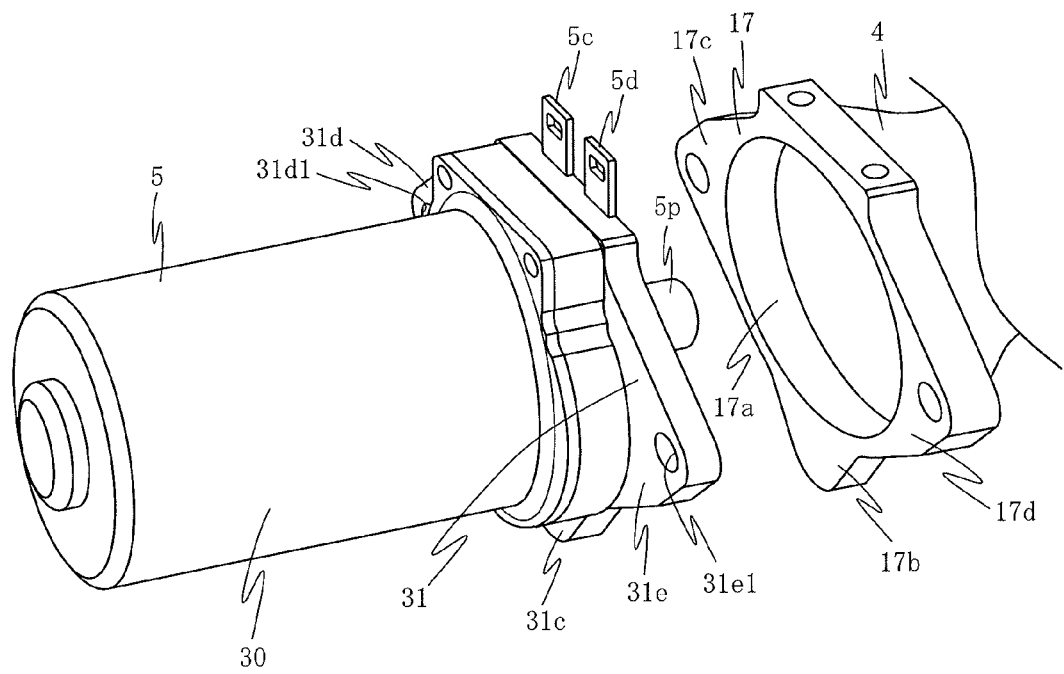
FIG. 7 is a view showing the electric motor and a motor mounting part of the speed reduction gear box according to a first embodiment.

Further, the motor mounting part 17 provided on an open end face of the worm housing 12 of the speed reduction gear box 4, as shown in FIG. 7, includes a mate fitting concave 17a into which the mate fitting convex 31b of the above-mentioned flange member 31 fit, a first abutting part 17b to which the first and the first mounting flange 31c abuts, first and second mounting part 17c,17d to which the first and the second mounting flanges 31d,31e respectively abut. On the first and the second mounting parts 17c,17d, a screw hole having the same diameter as the above-mentioned screw holes 31d1,31e1 are formed.

In the power steering device 1 having such a structure, after an assembly work of the steering column 3, the steering shaft 2, the worm 11, and the worm wheel 13, the mate fitting convex 31b of the electric motor 5 is fitted into the mate fitting convex 17a of the speed reduction gear box 4, the first abutting flange 31c, and the first and the second mounting flanges 31d,31e are abutted to the first abutting part 17b, and the first and the second mounting parts 17c,17d, the first and the second mounting flanges 31d,31e, and the first and the second mounting parts 17c,17d are fastened by a screw 33 (see FIG. 2). This mounts the electric motor 5 on the speed reduction gear box 4.

The connection terminals 5c,5d of the electric motor 5 are screwed to the terminal block 24c of the control unit 19 mounted on the control unit mounting part 20 of the speed reduction gear box 4.

Herein, the motor rotation part of the present invention corresponds to the armature, the motor side external junction of the present invention corresponds to the connection terminals 5c,5d, and the motor mounting part of the present invention corresponds to the motor mounting part 17.

Next, an explanation will then be made to an operation of the present embodiment.

Supplying electricity from a buttery to the power substrate 23 and the control substrate 25, with an ignition switch (not shown) of a vehicle being an ON state, carries out steering assist control processing by the micro control unit (MCU) and calculates a steering assist current command value based on a detection value of the torque sensor 15 and a speed sensor (not shown). Based on the steering assist current command value and the motor current detected by the motor current detection part, current feedback processing is carried out to calculate the voltage command value. By supplying the voltage command value to a gate driving circuit of the power substrate 23 to control the H-bridge circuit, a motor driving current flows to the electric motor 5 and drive so as to generate a steering assist force necessary for rotating the electric motor 5 in a normal direction and in a reverse direction.

Thus, a steering assist force is generated, in correspondence with steering torque from the electric motor 5 of the steering wheel, and the steering assist force is transmitted via the worm 11 and the worm wheel 13 to an output of the steering shaft 2, thereby steering the steering wheel with a light steering force.

Here, when the electric motor 5 transmits the steering assist force to the steering shaft 2, meshing backlash force generated between the worm 11 and the worm wheel 13 is transformed via the motor shaft 5p into a centrifugal whirling force of the armature built in the motor case 30, and is ultimately transmitted to the armature built in the motor case 30 as vibration. Moreover, noncontiguous centrifugal whirling caused by eccentricity due to a machining error and an assembly error of the worm 11 and the worm wheel 13.

When the centrifugal whirling force is transmitted to the armature, the overall electric motor 5 including the motor case 30 and the flange member 31 is to generate lurching behavior.

The flange member 31 of the electric motor 5 of the present embodiment provides two fixed points (first and second mounting flanges 31d,31e) to be fixed to the first and the second mounting parts 17c,17d of the motor mounting part 17 of the speed reduction gear box 4 at a line symmetry position with respect to a second phantom line K2. Between the first and the second mounting flanges 31d,31e in a circumferential direction, one first abutting flange 31c is provided, which abuts to the first abutting part 17b of the motor mounting part 17.

An arrangement position of the two first and the second mounting flanges 31d,31e and the one first abutting flange 31c is a position irregularly pitched in a circumferential direction of the flange member 31.

On that account, even when the overall electric motor 5 is to be lurching with two fixed points of the first and the second mounting flanges 31d,31e and the motor mounting part 17 as a fulcrum, an abutting position at which the first abutting flange 31c and the motor mounting part 17 (first abutting part 17b) suppresses the lurching behavior of the overall electric motor 5.

Further, even when the overall electric motor 5 is to be lurching with one fixed point and one abutting point of the first abutting flange 31c and the first mounting flange 31d, and the motor mounting part 17 as a fulcrum, the second fixed point of the second mounting flange 31e and the motor mounting part 17 (second mounting part 17d) suppress the lurching behavior of the overall electric motor 5.

Furthermore, even when the overall electric motor 5 is to be lurching with one fixed point and one abutting point of the first abutting flange 31c and the second mounting flange 31e, and the motor mounting part 17 as a fulcrum, the second fixed point of the first mounting flange 31d and the motor mounting part 17 (first mounting part 17c) suppress the lurching behavior of the overall electric motor 5.

In this way, since in the flange member 31 of the electric motor 5, the two first and the second mounting flanges 31d, 31e fixed to the motor mounting part 17 of the speed reduction gear box 4, and the first abutting flange 31c which is provided between these first and the second mounting flanges 31d,31e in a circumferential direction are provided at an irregularly pitched position in a circumferential direction of the flange member 31. Hence, it allows suppression of the lurching behavior of the overall electric motor 5 without impairing efficiency of an installation space of the electric motor 5, the control unit 19, and the speed reduction gear box 4.

Accordingly, since the present embodiment may suppress the lurching behavior of the electric motor 5, it precludes a possibility of aggravating harmonic components without impinging upon a rotational motion of the armature built in the motor case 30.

Since the lurching behavior of the overall electric motor 5 fixed to the speed reduction gear box 4 may be suppressed, even if the electric motor 5 and the control unit 19 of the mechatronically-integrated electric power steering device 1 is installed near driver's feet seated in the vehicle interior, it allows reduction of an operating sound replete in the vehicle interior originated in the electric motor 5. Hence, this provides the electric power steering device 1 excellent in quietness.

Then, shown in FIG. 8A to FIG. 8C, and FIG. 9 are an electric motor of a second embodiment according to the present invention. In this connection, the same components as those shown in FIG. 5 are denoted by the same reference numeral and their descriptions are omitted for brevity's sake.

Figure 8A:
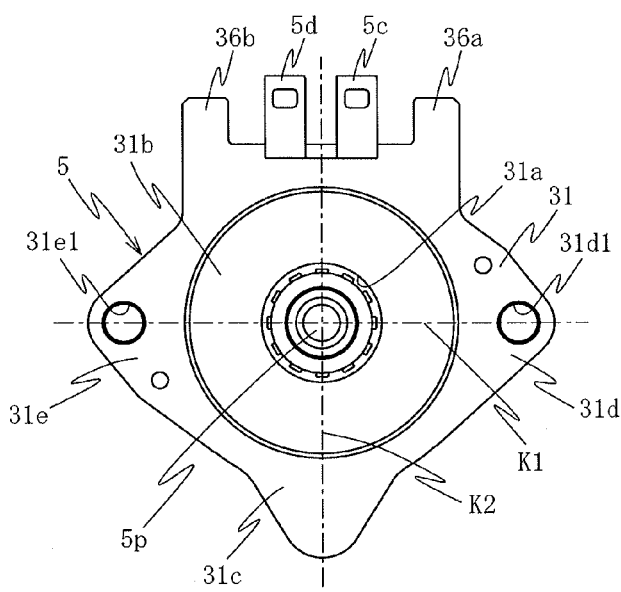
FIG. 8A is a view shown from a flange member side.
Figure 8B:
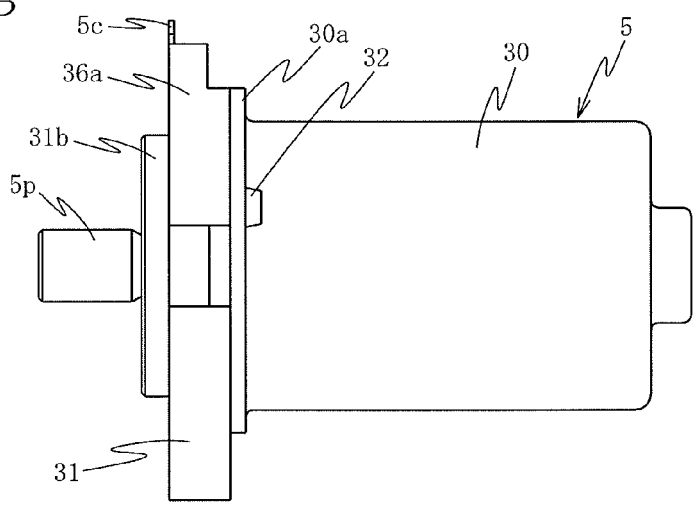
FIG. 8B is a cross-sectional view.
Figure 8C:
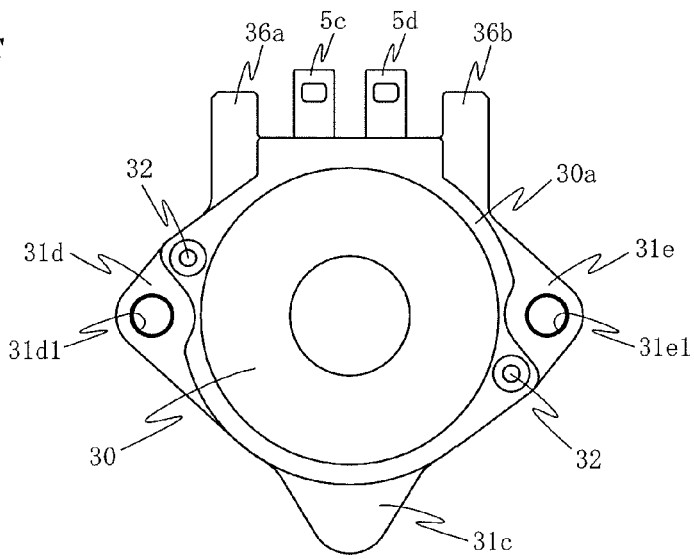
FIG. 8C is a view seen from a motor case side.

As shown in FIG. 8A, in the flange member 31 of the electric motor 5 of the present embodiment, a pair of second abutting flanges 36a,36b is provided at a position adjacent to the connection terminals 5c,5d so that they lie at a roughly line symmetry position with the first abutting flange 31c with respect to a first phantom line K1.

When the motor mounting part 17 of the speed reduction gear box 4 to which the electric motor 5 of the present embodiment is mounted is provided with an abutting receiving part (not shown) to which the aforesaid pair of the second abutting flanges 36a,36b abut.

In the electric motor 5 according to the present embodiment, the mate fitting convex 31b is fitted into the mate fitting concave 17a of the speed reduction gear box 4, the first and the second mounting flanges 31d,31e of the flange member 31 are abutted to the first and the second mounting parts 17c,17d of the motor mounting part 17, the first abutting flange 31*c* of the flange member 31 is abutted to the first abutting part 17*b* of the motor mounting part 17, the pair of the second abutting flanges 36*a*,36*b* of the flange member 31 is abutted to the abutting receiving part of the motor mounting part 17, and the first and the second mounting flanges 31*d*,31*e* and the first and second mounting parts 17*c*,17*d* are fitted to the speed reduction gear box 4 by screw clamping with a screw 33.

According to the present embodiment, when the electric motor 5 transmits a steering assist force to the steering shaft 2, meshing backlash generated between the worm 11 and the worm wheel 13 is transmitted via the motor shaft 5*p* as a centrifugal whirling force to the armature built in the motor case 30. When the overall electric motor 5 is to be lurching with the two fixed points of the first and the second mounting flanges 31*d*, 31*e* and the motor mounting part 17 as a fulcrum of an abutted point of the first abutting flange 31*c* and motor mounting part 17 (first abutting part 17*b*), the pair of the second abutting flanges 36*a*,36*d*, and the abutting receiving part of the motor mounting part 17 suppresses the lurching behavior of the overall electric motor 5.

In this manner, the flange member 31 of the electric motor 31 is provided with the two first and the second mounting flanges 31*d*,31*e* fixed to the motor mounting part 17 of the speed reduction gear box 4, the three abutting parts (first abutting flange 31*c*, and the pair of the second abutting flanges 36*a*,36*b*). Since these first and the second mounting flanges 31*a*, 31*e*, the first abutting flanges 31*e*, and the pair of the second abutting flanges 36*a*,36*b* are provided at an irregularly pitched position in a circumferential direction of the flange member 31, it allows further suppression of the lurching behavior of the overall electric motor 5.

Figure 9:
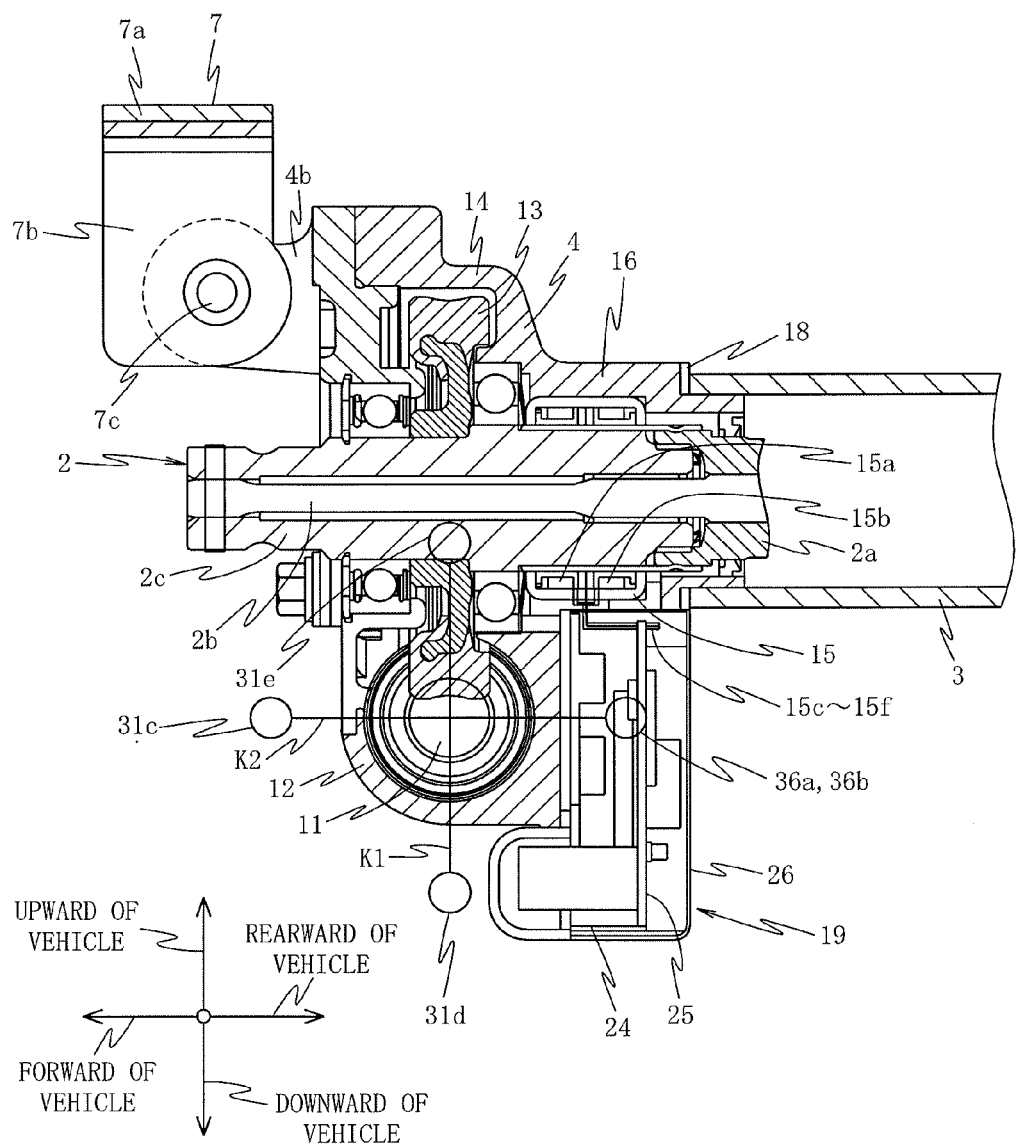
FIG. 9 is a view showing a position of a lateral direction of a vehicle and a longitudinal direction of the vehicle of a flange member fabricated in the electric motor according to a second embodiment.

Moreover, since in the present embodiment, as shown in FIG. 9, the first abutting flange 31*c* of the flange member 31 and the pair of the second abutting flanges 36*a*,36*b* are secured to the motor mounting part 17 apart from each other in a longitudinal direction of a vehicle, the first and the second mounting flanges 31*d*,31*e* of the flange member 31 are abutted to the motor amounting part 17 apart from each other in a vertical direction of the vehicle. Accordingly, the flange member 31 of the electric motor 5 is fixed to the motor mounting part 17 of the speed reduction gear box 4 at four points in a longitudinal and direction and a vertical direction, it allows secure prevention of the lurching behavior caused by a centrifugal whirling of the worm 11.

Herein, the first and the second mounting flanges 31*d*,31*e* apart from each other in the vertical direction of the vehicle and the motor mounting part 17 may exhibit its vibration suppression effect, despite the occurrence of the centrifugal whirling of the worm 11.

However, a position of the first abutting flange 31*c* and the pair of the second abutting flanges 36*a*,36*b* of the flange member 31 apart from each other in the longitudinal direction exhibits less vibration suppression effect by means of preload of weight of the electric motor 5 by gravity. Thus, preload or fixation is essential in this direction. Further, the connection terminals 5*c*,5*d* are positioned at a rear side in a longitudinal direction of the vehicle of the flange member 31 and it exhibits a vibration suppression effect when these connection terminals 5*c*,5*d* are joined to the terminal block 24*c* of the control unit 19. Additionally, since the first abutting flange 31*c* of the flange member 31 provided at the front side in the both longitudinal directions abuts to the motor mounting part 17, it achieves more suppressed vibration.

Further, the provision of the second abutting flanges 36*a*, 36*b* provides more suppressed vibration.

Furthermore, since the first abutting flange 31*c* of the flange member 31 is provided at the front side of the vehicle having ample space, it improves assembling ability of the electric power steering device 1, attains good space efficiency, and excludes interference to another components.

Moreover, the speed reduction gear box 4, the control unit 19, and the electric motor 5 are effectively arranged to secure stiffness of each coupling part, thereby mutually suppressing vibration.

Figure 10:
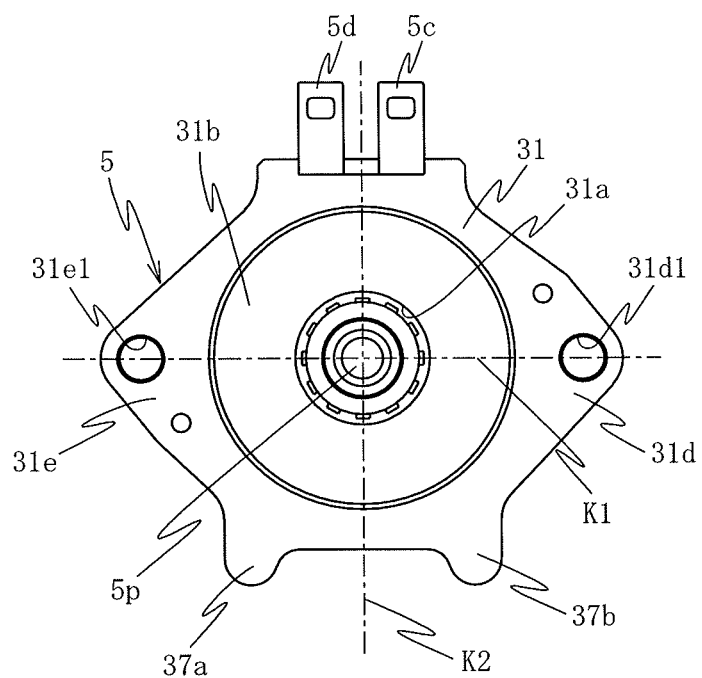
FIG. 10 is a view showing an electric motor according to a third embodiment seen from the flange member side.

Shown in FIG. 10 is an electric motor of a third embodiment according to the present invention.

Unlike the one first abutting flange 31*c* formed in the flange member 31 provided in the electric motor 5 of the first embodiment shown in FIG. 5A, the two (pair) of the first abutting flanges 37*a*,37*b* are provided apart from each other in a circumferential direction of the flange member 31.

The motor mounting part 17 of the speed reduction gear box 4 to which the electric motor 5 of the present embodiment is provided has an abutting receiving part (not shown) to which the two first abutting flanges 37*a*,37*b* are abutted when the flange member 31 is abutted.

In the electric motor 5 of the present embodiment, the mate fitting convex 31*b* is fitted into the mate fitting concave 17*a* of the speed reduction gear box 4, the first and the second mounting flanges 31*d*,31*e* of the flange member 31 are abutted to the first and the second mounting parts 17*c*,17*d* of the motor mounting part 17, the pair of the first abutting flanges 37*a*,37*b* of the flange member 31 are abutted to the abutting receiving part of the motor mounting part 17, and the first and the second mounting flanges 31*d*,31*e* and the first and the second mounting parts 17*c*,17*d* are fitted to the speed reduction gear box 4 by screw clamping with a screw.

According to the present embodiment, when the electric motor 5 transmits a steering assist force to the steering shaft 2, meshing backlash of the worm 11 and the worm wheel 13 is transmitted via the motor shaft 5*a* to the armature built in the motor case 30 as a centrifugal whirling force. When the overall electric motor 5 is to be lurching with the two fixed points of the first and the second mounting flanges 31*d*,31*e* and the motor mounting part 17 as a fulcrum, the two abutting parts of the pair of the first abutting flanges 37*a*,37*b* and the abutting receiving part of the motor mounting part 17 suppress the lurching behavior of the overall electric motor 5.

In this way, the flange member 31 of the electric motor 5 is provided with the two first and the second mounting flanges 31*a*,31*e* fixed to the motor mounting part 17 of the speed reduction gear box 4, the two abutting parts (pair of the first abutting flanges 37*a*,37*b*) abutted to the motor mounting part 17. Since these first and the second mounting flanges 31*d*,31*e*, and the pair of the first abutting flanges 37*a*,37*d* are provided at an irregularly pitched position in a circumferential direction of the flange member 31, it allows suppression of the lurching behavior of the overall electric motor 5.

Therefore, since the instant embodiment may suppress the lurching behavior of the overall electric motor 5, it does not impinge upon a rotational motion of the armature built in the motor case 30, which precludes a possibility of aggravating harmonic components. Additionally, because the lurching behavior of the overall electric motor 5 fixed to the speed reduction gear box 4 may be suppressed, this enables reduction of an operating sound replete in the vehicle interior spring from the electric motor 5, even when the electric motor 5 and the control unit 19 of the mechatronically-integrated electric power steering device 1 is arranged near driver's feet seated in the vehicle interior. This provides the electric power steering device 1 excellent in quietness.

Figure 11:
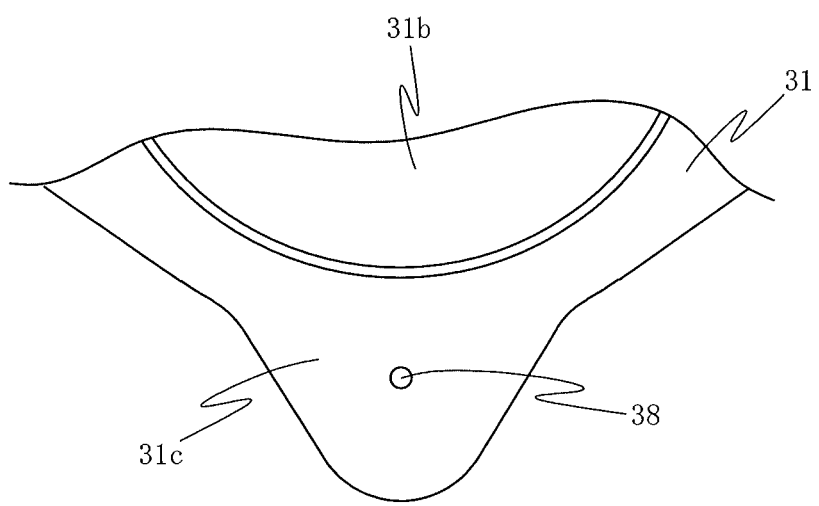
FIG. 11 is a view showing a principle part of an electric motor according to a fourth embodiment.

Shown in FIG. 11 is a principle part of an electric motor of a fourth embodiment according to the present invention.

The present embodiment is a modification of the one first abutting flange 31c provided on the flange member 31 of the electric motor 5 of the first embodiment shown in FIG. 5A. In the modification, a slightly protruding minute projection 38 is provided on part of a surface of the first abutting flange 31c to be abutted to the first abutting part 17b of the motor mounting part 17.

The provision of the minute projection 38 to a part of the surface of the first abutting flange 31c provides secure abutment of the minute projection 38 of the first abutting flange 31c to the first abutting part 17b, when the first and the second mounting flanges 31d,31e of the flange member 31 are fixed to the first and the second mounting parts 17c,17d of the motor mounting part 17. This eliminates the necessity for provision of the first abutting flange 31c and an abutting surface of the first abutting part 17b with increased precision, which reduces a manufacturing cost of the flange member 31 and the speed reduction gear box 4.

While in the present embodiment, the minute projection 38 is provided on a part of the surface of the first abutting flange 31c, it may provided in place thereof a minute projection on the first abutting part 17b of the motor mounting part 17. Alternatively, it may provide a minute projection either on part of the second abutting flanges 36a,36b and the abutting receiving part of the motor mounting part 17 of the second embodiment. Instead, it may provide a minute projection either on the first abutting flanges 37a,37b and the abutting receiving part of the motor mounting part 17.

Shown in FIG. 12 is a principal part of an electric motor of a fifth embodiment according to the present invention.

The present embodiment is a modification of the one first abutting flange 31c provided on the flange member 31 and the first abutting part 17b of the motor mounting part 17 of the electric motor 5 shown in FIG. 5A. The abutting surface of the first abutting flange 31c and the first abutting part 17b is formed into rough surfaces 31c2,17b2 by irregular unevenness etc thereon. Further, gap filler such as adhesive and elastic resin etc. is interposed between a gap formed of the abutted rough surfaces 31c2,17b2 to get rid of the gap.

Thus, abutting the rough surfaces 31c2,17b2 of the first flange 31c and the first abutting part 17b makes adhesiveness of the first abutting flange 31c and the first abutting part 17b better. Due to this, even when the overall electric motor 5 is to be lurching with the tow fixed points of the first and the second mounting flanges 31d,31e and the motor mounting part 17 as a fulcrum, the first abutting flange 31c and the first abutting part 17b excellent in their adhesiveness ensure secure suppression of the lurching behavior of the overall electric motor 5. Additionally, gap filler allows further improvement of adhesiveness.

Whereas in the present embodiment, the rough surfaces 31c2,17b2 are formed, between which the gap filler is interposed on the first abutting flange 31c and the first abutting part 17b, it may apply similar structure to the second abutting flanges 36a,36b and the abutting receiving part of the motor mounting part 17 of the second embodiment, and further on the first abutting flanges 37a,37b and the abutting receiving part of the motor mounting part 17 of the third embodiment.

Shown in FIG. 13 is a principal part of an electric motor of a sixth embodiment of the present invention.

The instant embodiment is a modification of the one first abutting flange 31c provided on the flange member 31 and the first abutting part 17b of the motor mounting part 17 of the electric motor 5 abutting thereto. In which case, a concave 39 is formed on part of the abutting surface of the first abutting flange 31c, a concave 40 is formed on part of the abutting surface of the first abutting part 17b facing the concave 39. An elastic body 41 made of rubber and resin etc. is filled into these concaves 39,40 in an elastically compressed state.

In this way, since the elastically compressed elastic body 41 is filled into the concaves 39,40 formed in the first abutting flange 31c and the first abutting part 17b, it attains good adhesiveness of the first abutting flange 31c and the first abutting part 17b. Thereby, even when the overall electric motor 5 is to be lurching with the two fixed points of the first and the second mounting flanges 31d,31e and the motor mounting part 17 as a fulcrum, the first abutting flange 31c and the first abutting part 17b excellent in adhesiveness enables secure suppression of the lurching behavior of the overall electric motor 5.

In this connection, while in the instant embodiment, the concaves 39,40 are formed in the first abutting flange 31c and the first abutting part 17b and the elastically compressed elastic body 41 is filled into these concaves, it may apply similar structure to the second abutting flanges 36a,36b and the abutting receiving part of the motor mounting part 17 of the second embodiment, and further to the first abutting flanges 37a,37b and the abutting receiving part of the motor mounting part 17 of the third embodiment.

Figure 14A:
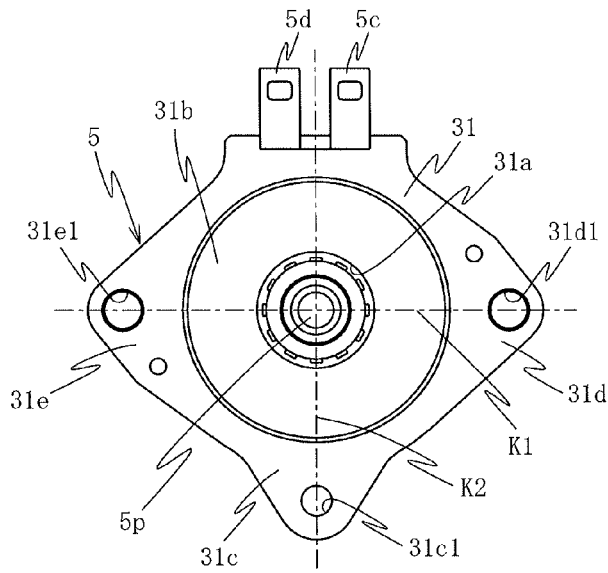
FIG. 14A is a view seen from the flange member side.
Figure 14B:
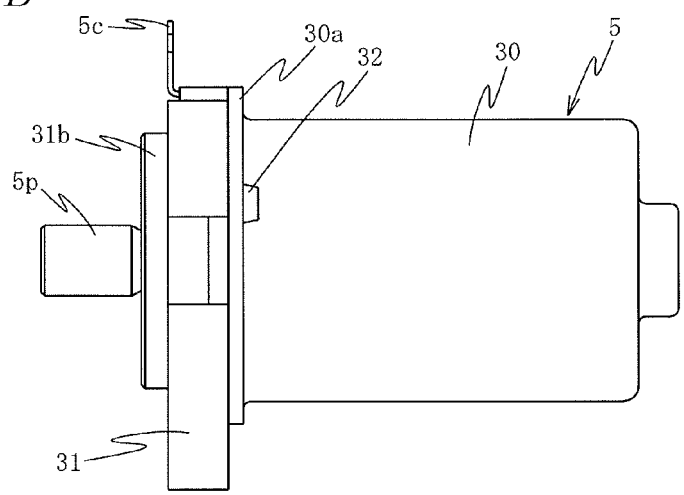
FIG. 14B is a side view.
Figure 14C:
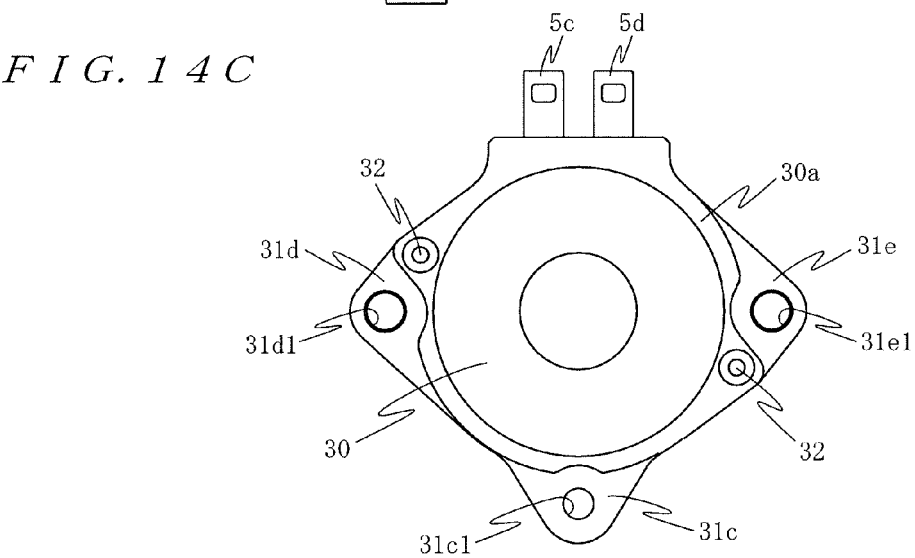
FIG. 14C is a view seen from the motor case side.

Shown in FIG. 14 is a principle part of an electric motor of a seventh embodiment according to the present invention.

In the flange member 31 of the instant embodiment, as shown FIG. 14A, screw holes 31c1,31d1, and 31e1 formed at equal distance from a shaft center of the motor shaft 5p on the first abutting flange 31c, and the first and the second mounting flanges 31d,31e. In addition, the diameter of the screw hole 31c1 of the first abutting flange 31c is set to a value smaller than the diameter of the screw holes 31d1,31e1 of the second mounting flanges 31d,31e.

Figure 15:
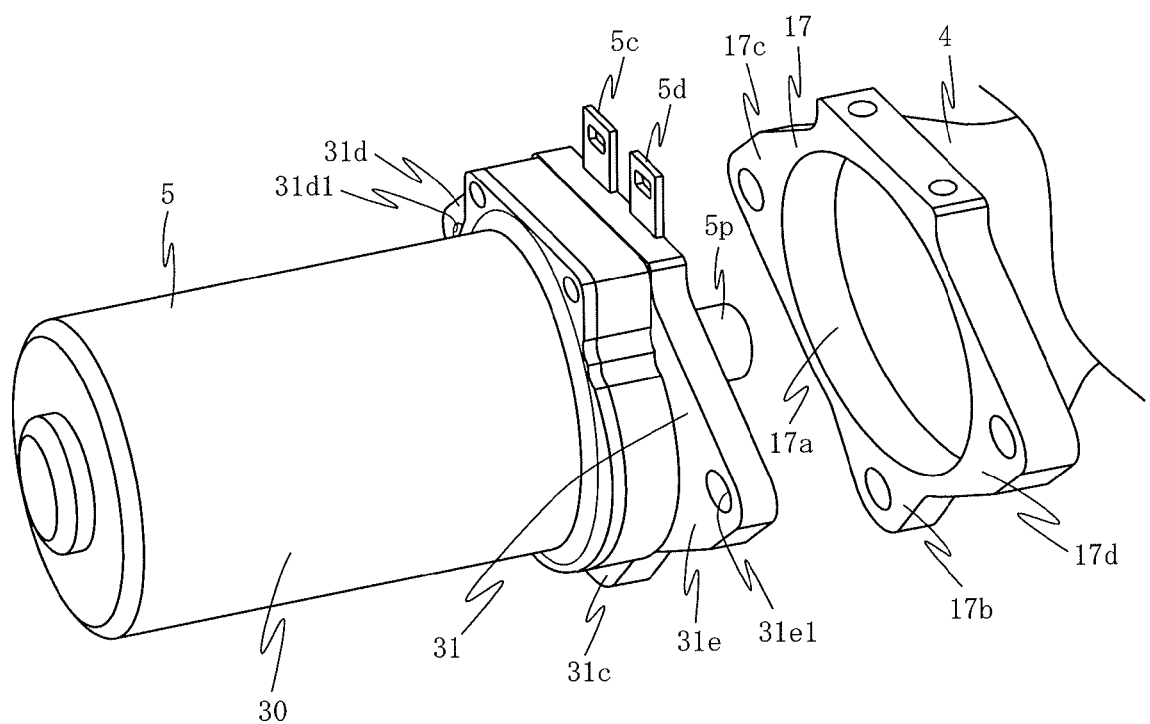
FIG. 15 is a view showing an electric motor and a motor mounting part of the speed reduction gear box according to the seventh embodiment.

Further, the motor mounting part 17 formed on an open end face of the worm housing 12 of the speed reduction gear box 4, as shown in FIG. 15, is provided with the mate fitting concave 17a into which the mate fitting convex 31b of the aforesaid flange member 31 fits, the first abutting part 17b to which the first abutting flange 31c abuts, and the first and the second attaching parts 17c,17d to which the first and the second attaching parts 31d,31e respectively abut. A screw hole having the same diameter as the abovementioned screw holes 31c1,31d1, and 31e1 is formed on the first abutting part 17b and the first and the second mounting parts 17c,17d.

The flange member 31 of the electric motor 5 of the instant embodiment is provided with the three first abutting flanges 31c, and the first and the second mounting flanges 31d,31e to be fixed to the motor mounting part 17 of the speed reduction gear box 4. Besides, since these flanges 31c to 31e are provided at an irregularly pitched position in a circumferential direction of the flange member 31, it enables suppression of the lurching behavior of the overall electric motor 5, without impairing efficiency of arrangement space of the electric motor 5, the control unit 19, and the speed reduction gear box 4.

Furthermore, as shown in FIG. 14A, the screw hole 31c1 formed in the first abutting flange 31c1 is set to a value smaller than the diameter of the screw holes 31d1,31e1 formed in the first and the second mounting flanges 31d,31e. Since an area across which the first abutting flange 31c abuts to the first abutting part 17b is set to be larger than that across which the first abutting flange 31d abuts to the first abutting part 17c, and that across which the second attaching flange 31e abuts to the second attaching part 17d, the lurching of the overall electric motor 5 toward the first abutting flange 31c side may satisfactory receive as well as improve space efficiency by reducing an external form.

Herein, while in FIG. 14A, the screw holes 31c1,31d1, and 31e1 are formed at equal distance from the shaft center of the motor shaft 5p on the first abutting flange 31c, and the first and the second attaching flanges 31d,31e, setting, as shown in FIG. 16, to make the distance d1 from the shaft center of the motor shaft 5p of the screw hole 31c of the first abutting flange 31c longer than the distance d2 from the shaft center of the motor shaft 5p of the screw holes 31d1,31e1 of the first and the second mounting flanges 31d,31 (d1>d2) may set larger backlash to the moment when the overall electric motor is to lurching, thereby further suppressing the lurching behavior of the overall electric motor 5.

Moreover, as shown in FIG. 17, in a case flange part 35 of the motor case 35 of the electric motor 5, assume that evanginating parts 35a1 to 35c having the same outer shape as that of the first abutting flange 31c, and the first and the second flange mounting member 31 and the first and the second mounting flanges 31d, 31e of the flange members 31 are provided, adopting a structure in which the evanginating parts 35a1 to 35c of the case flange part 35a are simultaneously fixed, when the first abutting flange 31c of the flange member 31 and the first and the second mounting flanges 31a,31e are fixed by screw clamping. This enables suppression of the lurching behavior of the overall electric motor 5 because stiffness of the case flange part 35a increases.

Figure 18A:
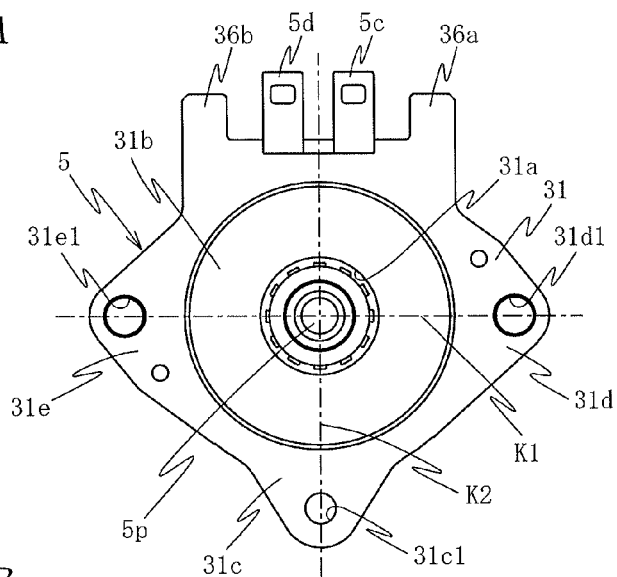
FIG. 18A is a view seen from the flange member side.
Figure 18B:
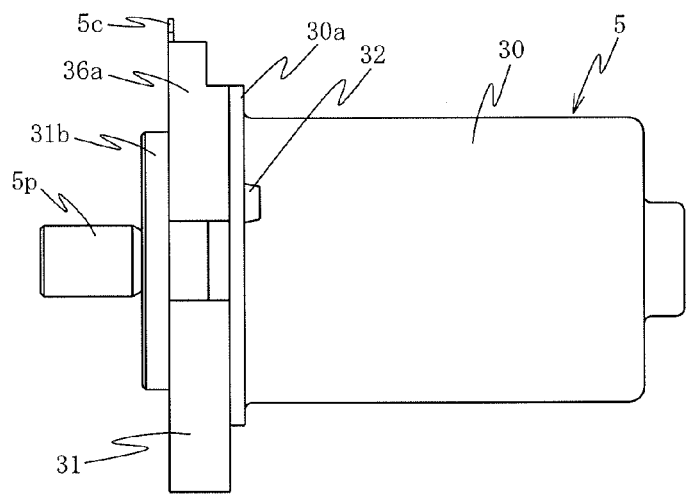
FIG. 18B is a side view.
Figure 18C:
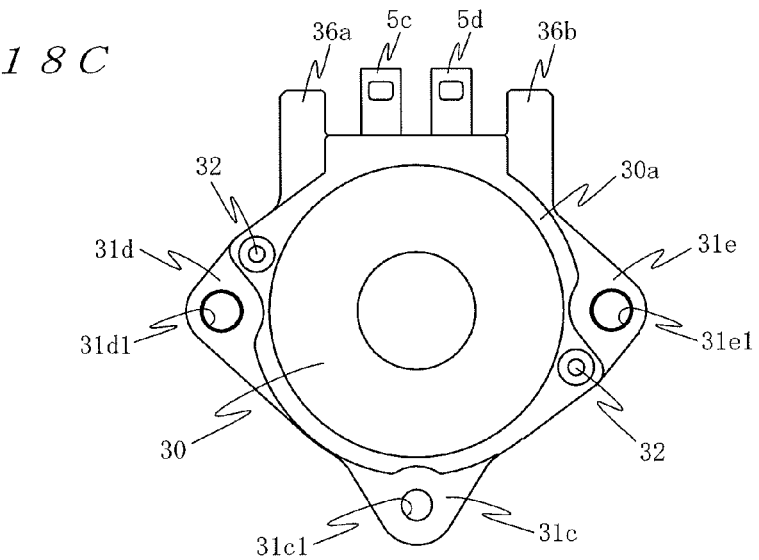

Shown in FIGS. 18A to 18C is an electric motor of an eighth embodiment according to the present invention.

In the flange member 31 of the electric motor 5 of the instant embodiment, a pair of second abutting flanges 36a, 36b are provided in the flange member 31 of the second embodiment shown in FIG. 14 at a position adjacent to connection terminals 5c,5d of the flange member, so as to be a locally line symmetry position with the first mounting flange 31c with respect to a first phantom line K1.

An abutting receiving part (not shown) abutting in a surface contact state to the pair of the aforesaid second abutting flanges 36a,36b is formed, when the flange member 31 abuts, in the motor mounting part 17 of the speed reduction gear box 4 on which the electric motor 6 of the present embodiment is mounted.

According to the present embodiment, when the electric motor 5 transits a steering assist force to the steering shaft 2, meshing backlash generated between the worm 11 and the worm wheel 13 is transmitted as a centrifugal whirling force via the motor shaft 5p to the armature built in the motor case 30. When the overall electric motor 5 is to lurching with the two fixed points of the first and the second mounting flanges 31d,31e and the motor mounting part 17 as a fulcrum, the three fixed points of the first abutting flange 31c and the motor mounting part 17 (first mounting part 17b), and the pair of the second abutting flanges 36a,36b abutted to the abutting receiving part of the motor mounting part 17 at a position apart from the motor center suppress the lurching behavior of the overall electric motor 5.

Thus, in the flange member 31 of the electric motor 5, the first abutting flange 31c and the pair of the second flanges 36a,36b of the flange member 31 are fixed to the motor mounting part 17 apart from each other in a longitudinal direction of a vehicle. The first mounting flange 31d and the second mounting flange 31e of the flange member 31 are abutted to the motor mounting part 17 apart from each other in a vertical direction of a vehicle. Since the flange member 31 of the electric motor 5 is fixed to the motor mounting part 17 of the speed reduction gear box 4 at four points in the longitudinal and vertical directions of the vehicle, it securely prevents the lurching behavior due to the centrifugal whirling of the worm 11.

Whereas in the aforesaid instant embodiment, an explanation was made to the case where the brush motor is applied as the electric motor 5, not limited thereto, it may provide a brushless motor built in the motor case. In this case, it has to connect the connection terminals 5c,5d to a feeding side of an excitation coil of each phase, as well as to implement on the power substrate 23 an inverter circuit including a FET (Field-Effect Transistor) to drive a brushless motor inverter circuit and a gate driving circuit to drive using a pulse width modulation signal to the field-effect transistor of the inverter circuit.

Furthermore, while in the aforementioned instant embodiment, an explanation was made to the case where the present invention is applied to a right-hand drive car, not limited thereto, when the present invention is applied to a left-hand drive car, it has to arrange the electric motor 5 and the control unit 19 at the right of plane symmetry with a vertical plane running along the center shaft of the steering column 3.

INDUSTRIAL APPLICABILITY

As discussed in the above, since the electric power steering device according to the present invention suppresses the lurching behavior of the electric motor mounted on the speed reduction gear box, it is beneficial for reduction of an operating sound produced from the electric motor, without impinging upon the harmonics components of the electric motor.

REFERENCE SIGNS LIST

1: electric power steering device
2: steering shaft
2a: input shaft
2b: torsion bar
2c: output shaft
3: steering column
4: speed reduction gear box
4b: support
5: electric motor
5b: flange
5c,5d: connection terminal
5f: flange support
5g,5h: brush
5i,5j: connection terminal
5p: motor shaft
6: upper mounting bracket
7: lower mounting bracket
11: worm
12: worm housing
13: worm wheel
14: worm wheel housing
15: torque sensor
15a,15b: detection coil
15c to 15f: external connection terminal
16: torque sensor housing
17: motor mounting part
17a: mate fitting concave
17b: first abutting part
17b2: rough surface
17c: first mounting surface
17d: second mounting surface
18: column mounting part
19: control unit 20: control unit a mounting part
21: heat discharging plate
22a: connection terminal
23: power substrate
23a,23b: discrete parts
24: synthetic resin frame
24a: frame body
24b: mounting plate
24c: terminal block
25: control substrate
25e to 25d: through hole
25e: discrete parts
26: cover
30: motor case
30a: case flange part
31: flange member
31a: shaft hole
31b: mate fitting convex
31c: first abutting flange
31c2: rough surface
31c3: screw hole
31d: first mounting flange
31d1: screw hole
31e: second mounting flange
31e1: screw hole
32,33: screw
35: motor case
3511 to 35c: evanginating part
36a,36b: second abutting flange
37a,37b: first abutting flange
38: minute projection part
39,40: concave
41: elastic body
45: female connector
45a: power connector
45b: signal connector
60: universal joint
61: lower shaft
62: universal joint
K1: first phantom line
K2: second phantom line

The invention claimed is:

1. An electric power steering device comprising:
a steering column including a steering shaft in the steering column, the steering column transmitting steering torque;
an electric motor for transmitting a steering assist force via a worm speed reduction mechanism in a speed reduction gear box to the steering shaft;
a control unit for driving the electric motor; and
a motor mounting part provided in the speed reduction gear box, the electric motor being mounted on the motor mounting part, a motor shaft of the electric motor being joined to a worm meshed with a worm wheel of the worm speed reduction mechanism,
wherein the electric motor includes a motor case formed in a cylindrical shape and having an open end to include a motor rotation part in the motor case, and a substantially disc-shaped flange member linked to the motor case so as to cover the open end of the motor case,
the flange member is provided with two mounting flanges and at least one first abutting flange at uneven interval in a circumferential direction of the flange member, the two mounting flanges being outwardly swollen and fixed to the motor mounting part, and the first abutting flange being outwardly swollen between the two mounting flanges and abutting to the motor mounting part, and
a minute projection is provided at one abutting surface out of a first abutting surface of the first abutting flange and a second abutting surface of the motor mounting part, the second abutting surface abutting to the first abutting surface, the minute projection locally abutting to the other abutting surface out of the first abutting surface and the second abutting surface.

2. The electric power steering device according to claim 1, wherein:
a motor side external connecting part is protrudingly provided to connect to a unit side connecting part of the control unit at an outer circumference of the flange member,
the first abutting flange is provided at a line symmetry position with the motor side external connecting part with respect to a first phantom line orthogonal to a shaft center of the motor shaft, and
the two mounting flanges are provided at a line symmetry position with each other with respect to a second phantom line orthogonal to the first phantom line on a same plane.

3. The electric power steering device according to claim 2, wherein the first abutting flange is provided at a position nearer to a front of a vehicle than the first phantom line.

4. The electric power steering device according to claim 3, wherein the at least one first abutting flange includes two first abutting flanges, and the two first abutting flanges are provided apart from each other in a circumferential direction at a substantially line symmetry position with the motor side external connecting part.

5. The electric power steering device according to claim 4, wherein the two first abutting flanges are provided apart from each other in a vertical direction of a vehicle and the two mounting flanges are provided apart from each other in a vertical direction of the vehicle.

6. The electric power steering device according to claim 1, wherein the flange member includes a second abutting flange which is outwardly swollen and abuts to the motor mounting part, wherein the second abutting flange is provided at a position which is line symmetry with the first abutting flange with respect to the first phantom line, the position being adjacent to a motor side external connecting part connected to a unit side external connecting part of the control unit.

7. The electric power steering device according to claim 1, wherein the at least one first abutting flange includes a single first abutting flange,
the two mounting flanges and the single first abutting flange have screw holes, respectively,
screw members screwed into the screw holes, respectively are fastened to the motor mounting part for fixing the two mounting flanges and the single first abutting flange to the motor mounting part, and
a diameter of the screw hole of at least one of the two mounting flanges and the single first abutting flange is smaller than that of another of the two mounting flanges and the single first abutting flange.

8. The electric power steering device according to claim 1, wherein the first abutting surface and the second abutting surface are formed into rough surfaces having irregular unevenness, and gap filler is filled into a gap between the rough surfaces.

9. The electric power steering device according to claim 1, wherein concaves are formed on positions facing each other on the first abutting surface and the second abutting surface, and an elastic body is filled elastically compressed into the concaves.

* * * * *